United States Patent [19]

Chambon et al.

[11] Patent Number: 5,320,798

[45] Date of Patent: Jun. 14, 1994

[54] METHOD FOR PROCESSING POLYOLEFINS AT HIGH SHEAR RATES

[75] Inventors: Francois Chambon, Brussels, Belgium; Jean-Marc C. Dekoninck, Houston, Tex.

[73] Assignee: Exxon Chemical Patents, Inc., Linden, N.J.

[21] Appl. No.: 18,605

[22] Filed: Feb. 17, 1993

[51] Int. Cl.$^5$ ............................................. B29C 47/92
[52] U.S. Cl. .................................. 264/564; 264/171; 264/174; 264/169; 264/176.1; 264/216; 264/331.17; 425/113; 425/461
[58] Field of Search .................. 264/174, 176.1, 564, 264/216, 169, 171, 331.17; 425/378.1, 461, 376.1, 113

[56] References Cited

U.S. PATENT DOCUMENTS

| | | | |
|---|---|---|---|
| 2,991,508 | 7/1961 | Fields. | |
| 3,382,535 | 5/1968 | Ferrari | 425/461 |
| 3,920,782 | 11/1975 | Cogswell | 264/176.1 |
| 4,623,502 | 11/1986 | Cohen | 264/176.1 |
| 4,713,205 | 12/1987 | Su | 264/176.1 |
| 4,859,398 | 8/1989 | Su. | |
| 4,948,543 | 8/1990 | Pawlowski et al. | 264/176.1 |

FOREIGN PATENT DOCUMENTS 884878  12/1961  United Kingdom ............. 264/176.1

OTHER PUBLICATIONS

Rauwendaal, C. "How Proper Die Design Can Improve Profile Quality" Plastics World, Nov. 1991, pp. 73-75.

*Primary Examiner*—Jeffery Thurlow
*Attorney, Agent, or Firm*—Catherine L. Bell

[57] ABSTRACT

Processing, particularly extruding polyolefins having low MI, narrow MWD at extrusion temperatures less than about 200° C. and at shear rates less than about 2000 sec$^{-1}$ but immediately above the shear rate corresponding to the end of the slipstick region of the polyolefin produces a new window of processing conditions to produce smooth polymers that do not have sharkskin melt fracture or wavy surfaces.

14 Claims, No Drawings

METHOD FOR PROCESSING POLYOLEFINS AT HIGH SHEAR RATES

BACKGROUND OF THE INVENTION

1. Field of Invention

This invention relates generally to processing of polyolefins, and more particularly processing through a die of polyethylene polymers and copolymers.

2. Description of the Relevant Art

The processing of polyethylene and extrusion of polyethylene or polyolefins is a multi-talented skill long studied in the art. There are many different parameters that influence whether a polymer is processable or not at high speeds. Such parameters include the melt index (MI), the molecular weight (Mw), the molecular weight distribution (Mw/Mn) and such. For example, it is assumed in the art that low MI polymers need high temperatures for processability, and if these conditions are not maintained, then the extrudate will have defects. Likewise even at low shear rates, high molecular weight, low MI polyethylenes extruded through a die produce a rough surface extrudate considered defective, typically called sharkskin or melt fracture. Appearance of this surface defect usually sets the maximum throughput for most processing equipments, such as film-blowing, profile extrusion or film-casting. Thus, the processing may go no faster than that point at which the sharkskin melt fracture typically appears. Some polyethylenes, for example HDPE, are also known to show what is called a "slipstick transition" when extruded at very high shear rates, which are too high for most practical purposes, typically over 1000, even above 2000 sec$^{-1}$. This slipstick transition is the point at which the sharkskin or stick region converts to a slip or fast-moving wavy extrudate surface and is typically characterized by a pressure fluctuation over time. Some polymers exhibit sharp slipstick transitions characterized by high pressure fluctuations when pressure is compared to time. Other polymers do not display harsh slipstick transitions. For example, LDPE is not believed to undergo a typical slipstick transition, and if it does, it is greatly above a shear rate of 2000 sec$^{-1}$.

When increasing the shear rate of a polymer extruded through a die, several transitions may be observed. For example, at low shear rate, the extrudate is smooth, and the shear stress is typically constant with time at any particular shear rate. This is the traditional operating range where most polymers are processed in industry today. With increasing shear rate, the extrudate surface becomes matt then deformed. This is typically called the sharkskin region and like the "smooth" region, shear stress is apparently constant with time at any particular shear rate. In the literature polyethylene is reported to display sharkskin beginning at shear rates for which the shear stress is higher than about $\sim$0.2 MPa.

At high shear stress, typically 0.5 MPa and above, the extrudate surface is wavy and highly distorted. This region is often called the wavy region or gross distortion region.

For some polymers, one or two additional regions are observed. One is called the slipstick region, and is typically characterized by the following: (1) the shear stress versus shear rate is essentially flat; (2) the measured pressure oscillates periodically over time; and/or (3) the surface of the extrudate consists of two distinct regions, one (typically sharkskin) corresponding with increasing pressure, and one (typically smooth) corresponding with decreasing pressure. The actual surface appearance depends upon the shear stress at which slipstick occurs. At shear rates above the slipstick region, and as long as the shear stress is below the onset of the wavy region, the extrudate is smooth and glossy. This is called the glossy region.

The glossy region is an acceptable operating region in terms of extrudate surface appearance, and extrusion stability. It is highly desirable in terms of throughput and melt viscosity (high throughput, low melt viscosity). Unfortunately, the shear rates required to be in the glossy region are usually too high for most practical application such as film/coating applications. Likewise, the shear stress at which the slipstick occurs is also typically too high, so that the glossy region is not observed, and the extrudate is wavy at shear rates immediately above the slipstick region.

U.S. Pat. No. 4,859,398 to Su, herein describes a method to process polyethylene, particularly LLDPE, at high shear rates, preferably above 1000 sec$^{-1}$. By reducing the extrusion temperature to just above the melting temperature of the polyethylene (about 140° C.) and processing at shear rates above 1000 sec$^{-1}$, Su found a smooth surface in the extrudate.

U.S Pat. No. 2,991,508 to Fields, discloses the "super extrusion" of high density polyethylene at melt temperatures over 235° C. and shear rate up to 8,000 sec$^{-1}$. The super extrusion is disclosed to vary with die temperature.

Speeds above 1000 sec$^{-1}$ are impractical, however, for most polyolefin processing. Thus it would be desirable to develop a process for processing polyolefins at speeds faster than those currently in commercial use but less than 1000 sec$^{-1}$ without obtaining sharkskin melt fracture.

SUMMARY OF THE INVENTION

This invention relates to a process for processing a polyolefin comprising: (1) heating a polyolefin having a Mw/Mn ratio of less than about 3.3, an MI less than about 5 g/10 min. and (2) extruding the polyolefin at an extrusion temperature less than about 200° C. and at a shear rate immediately above the shear rate at the end of the slipstick region of said polyolefin but less than 2000 sec$^{-1}$, preferably less than 1000 sec$^{-1}$.

DETAILED DESCRIPTION OF THE PREFERRED EMBODIMENTS

It has been discovered that certain polyolefins, particularly copolymers and polymers of ethylene, having a low melt index, a narrow molecular weight distribution, and an extrusion temperature less than about 200° C. exhibit a slipstick transition at a relatively low shear rate. It has also been discovered that by extruding these polyolefins at a shear rate immediately above the shear rate at the end of the slipstick region transition smooth extrudates and low melt viscosities can be obtained. This is a highly desirable characteristic because it permits extruding resins at high throughput with minimum power consumption. It has further been discovered that these polyolefins show their slipstick transition at low shear rates and low temperatures.

Polyolefins useful in the process of this invention are homopolymers and copolymers of polyolefins, particularly ethylene or propylene copolymers, even more particularly ethylene homo and copolymers. The ethylene polymers can have comonomers of $C_3$ and above.

The term copolymer as used herein is defined to include polymers of 2, 3, 4 or more different monomers.

The polyolefins useful in this invention preferably have a density above about 0.87 g/cm$^3$, more preferably between 0.88 and less than about −0.95 g/cm$^3$, even more preferably between 0.89 and less than about −0.95 g/cm$^3$ as measured by ASTM (American Society for Testing and Materials) 792. The polyolefins useful in this invention further have molecular weight distribution (Mw/Mn) less than about 3.3, preferably less than about 3.0. The lower the molecular weight distribution, the better. Furthermore, the polyolefins useful in this invention have a melt index as measured by ASTM method D1238 of 0.01 to 5 g/10 min, preferably from 0.01 to 4 g/10 min, even more preferably from 0.01 to 2 g/10 min. Again, the lower the melt index, the better. Molecular weight distribution is herein defined to be the ratio of weight average molecular weight to number average molecular weight. The molecular weights are measured by GPC, gas permeation chromotography. Molecular weight determinations for polyolefin products are made by gel permeation chromatography (GPC) according to the following technique. Molecular weights and molecular weight distributions are measured using a Waters 150 gel permeation chromatograph equipped with a differential refractive index (DRI) detector and a Chromatix KMX-6 on-line light scattering photometer. The system is used at 135° C. with 1,2,4-trichlorobenzene as the mobile phase. Shodex (Showa Denko America, Inc.) polystyrene gel columns 802, 803, 804 and 805 are used. This technique is discussed in "Liquid Chromatography of Polymers and Related Materials III", J. Cazes editor, Marcel Dekker, 1981, p. 207 which is incorporated herein by reference. No corrections for column spreading are employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package, run on a HP 1000 computer. Furthermore, the process of this invention is characterized by a shear rate higher than the slipstick transition of the polymer but lower than 2000 sec$^{-1}$, preferably lower than 1000 sec$^{-1}$. The following are defined for a cylindrical die: shear rate (sec$^{-1}$)=32(v)/$\pi$d$^3$ in sec$^{-1}$ (v=volumetric flow of polymer through the die (cc/s), d=die diameter (cm)); shear stress (MPa)=P(d)/4l (P=entrance die pressure (MPa), d=die diameter (cm), l=die length (cm)); and melt viscosity=shear stress/shear rate.

Slipstick region, Smooth stable region and skarkskin region are discussed in "Wall Slip and Extrudate Distortion in Linear Low-density Polyethylene" by Douglass S. Kalika and Morton M. Denn, Journal of Rheology, 31 (8), p815–834, (1987) which is incorporated by reference herein. Slipstick as used in this invention is measured by the following method: (1) using a capillary rheometer with a cylindrical die of length=10 mm, diameter=1 mm; (2) setting the temperature at the value of interest i.e., anywhere between the polymer melting temperature and 200° C.; (3) measuring the flow curve by increasing the shear rate from 1 to 2000 sec$^{-1}$; (4) measuring the shear stress; (5) observing the surface appearance of the extrudate; and (6) noting shear rate and shear stress just after slipstick region. Slipstick region can be determined by any one of or a combination of the following: (1) shear stress is constant vs. shear rate; (2) there is a periodic fluctuation of head pressure; or (3) there is a periodic fluctuation in extrudate surface appearance.

The materials and process of this invention are such that shear rate just after the slipstick transition is typically less than about 2000 sec$^{-1}$, preferably less than 1000 sec$^{-1}$ and shear stress just after slipstick region is less than about 0.50 MPa, preferably less than about 0.45 MPa. The temperature range at which the processing of these polymers is conducted is typically less than about 200° C., preferably less than about 190° C., even more preferably between about 60° C. and about 170° C., We have discovered that some polyolefins when processed under specific extrusion conditions, do have a glossy region attainable in practical film/coating application. The conditions required for the products and processes of this invention are that the glossy region starts at shear rates below 2000 sec$^{-1}$ preferably below 1000$^{-1}$ and at shear stress below 0.50 MPa, preferably below 0.45 MPa. This is typically achieved through a combination of narrow MWD and low melt index with low extrusion temperatures. It has been discovered that the polyolefins processed according to this invention provide the unique advantage of being able to process a low melt index polymer at low temperatures and a high shear rate. Thus, the instant process produces a polymer with a visibly smooth, non-sharkskin, non-wavy surface at lower operating temperatures and viscosities.

A method to produce the polyolefins used in this invention includes using an activated cyclopentadienyl group 4 transition metal complex as a catalyst in gas phase, solution phase, high pressure, medium pressure, low pressure, in bulk, or other such conditions typically known in the art. The catalysts capable of producing polyolefins useful in this invention are disclosed in: U.S. Pat. No. 5,055,438, issued Oct. 8. 1991, U.S. Pat. No. 5,057,475, issued Oct. 15, 1991, U.S. Pat. No. 5,096,867, issued Mar. 17, 1992, U.S. application Ser. No. 542,236, filed Jun. 22, 1990, European Patent Application 129,368, published Dec. 17, 1984, U.S. application Ser. No. 468,382, filed Feb. 28, 1990, now abandoned, European Patent Application 520, 732, published Dec. 30, 1992, U.S. Pat. No. 5,017,714, issued May 21, 1992, U.S. application Ser. No. 885,170, filed May 18, 1992, now U.S. Pat. No. 5,240,894 U.S. Pat. No. 5,198,401 issued Mar. 30, 1993, U.S. Pat. No. 5,153,157, issued Oct. 6, 1992, European Patent Application 277,003, published Jun. 3, 1988, European Patent Application 277,004, published Jun. 3, 1988, U.S. application Ser. No. 926,006 filed Aug. 5, 1992, which are herein incorporated by reference as if fully set forth.

Another method to produce the polyolefins useful in this invention would be selective extraction or separation methods known in the art. Homogeneous catalysis is also known to produce narrow MWD polymers and would produce polyolefins useful in this invention.

The polymer produced can be used for wire and cable coating, for casting applications, for blown film, cast film, extrusion coating, extrusion-coated wire, extrusion-coated cables, laminates and the like. The following examples are intended to illustrate process and product properties of specific embodiments of the invention and are not intended to limit the scope of the invention.

EXAMPLES

Examples 1-8 were run in a Goettfert Capillary Rheometer with a cylindrical die diameter of 1 mm. Runs 1 and 8 are for comparative purposes.

The polymers were tested at shear rates from 10 up to 2000 s$^{-1}$.

The viscosity is the shear stress/shear rate.

The extrudate surface is continually observed and is assessed as an operating range if the surface is smooth, absent of apparent defects, and if the shear stress is stable over time.

| The equipment conditions were: | |
|---|---|
| Equipment: | Goettfert Rheograph 2002 |
| Melting time: | 4 minutes |
| Test piston diameter: | 15 mm |
| Test temperature: | see table |
| Die diameter | 1 mm |
| Die length: | see table |

The data are presented in Table 1.

Traditional operating range is the shear rate range starting from 0 sec$^{-1}$ and ending at the shear rate at which sharkskin melt fracture starts. New operating range is the shear rate range immediately above the shear rate at the end of the slip-stick region and where the surface remains without defects which normally occur as long as the shear stress is below −0.5 MPa. Minimum viscosity is the minimum viscosity observed in the range. This is typically the viscosity at the higher shear rate of the range.

LL1004 is a commercially available LLDPE with a molecular weight distribution of 3.7 and a slipstick region that ends above 2000 sec$^{-1}$. Examples 2-7 are polyethylene copolymers with a MWD below 3.5.

EXAMPLE 9

Exact 3010 D, an ethylene/butene copolymer having an MI of 1 g/10 min and a density of 0.90 g/cc, produced commercially by Exxon Chemical Company was used. The trial was generated on a Haake Extrusion Rheometer (Rheocord Model E). The temperature profile within the barrel was 40°/70°/105° C. A rod die with final land section of 0.635 cm was used. Head pressure and torque were measured. Data are summarized in Table 2.

TABLE 2

| Head Pressure (psi) | 900 | 1350 | 1250 | 1300 |
|---|---|---|---|---|
| RPM | 20 | 80 | 170 | 300 |
| Torque (kg · m) | 26 | 51 | 53 | 38 |
| Surface appearance | Smooth | Slight Sharkskin | Severe Sharkskin | Smooth Glossy |

Note that the glossy region was observed in this experiment at 300 RPM, while the traditional operating window was limited at around 80 RPM. Note also that the torque was very low in the glossy region which is highly desirable.

Melt index was measured according to ASTM D1238. Density was measured according to ASTM D792.

As is apparent from the foregoing description, the

TABLE 1

| | | | | MI | Density | Capillary | Extrusion | Trad. Operating Range | | New Operating Range | |
|---|---|---|---|---|---|---|---|---|---|---|---|
| Run | polymer | co-monomer | MWD | (g/10 min) | (g/cc) | die 1 (cm) | Temp. (°C.) | Shear rate (s$^{-1}$) | Min. Vis. (Pa.s) | Shear rate (s$^{-1}$) | Min. Vis. (Pa.s) |
| 1 | LL1004 7B | Butene | 3.7 | 2.8 | 0.92 | 1.0 | 190 | 0-400 | 590 | >2000 | — |
| 2 | Exact 3010 | Butene | 2.0 | 3.5 | 0.91 | 1.0 | 150 | 0-60 | 2730 | 650-2000 | 400 |
| 3 | Exact 3010 | Butene | 2.0 | 3.5 | 0.91 | 1.0 | 190 | 0-250 | 950 | 2000 | 440 |
| 4 | Exp 1 | Hexene | 2.3 | 4.0 | 0.945 | 1.0 | 150 | 0-200 | 1070 | 800-2000 | 300 |
| 5 | Exp 2 | Hexene | 2.2 | 0.6 | 0.88 | 1.0 | 150 | 0-10 | 17900 | 400-2000 | 490 |
| 6 | Exp 2 | Hexene | 2.2 | 0.6 | 0.88 | 1.0 | 190 | 0-20 | 10950 | 500-2000 | 500 |
| 7 | Exp 3 | Hexene | 2.4 | 1.4 | 0.90 | 3.0 | 150 | 0-60 | 4600 | 700-2000 | 460 |
| 8 | Exp 3 | hexene | 2.4 | 1.4 | 0.90 | 1.0 | 240 | 0-300 | 830 | >2000 | — |

*Minimum viscosity is the smallest apparent melt viscosity observed.

Example 1 is a conventional LLDPE with a broad molecular weight distribution, a broad composition distribution and a slipstick region ends above 2000 sec$^{-1}$. Example 8 is a polyolefin made by an activated cyclopentadienyl transition metal catalyst having narrow MWD, narrow composition distribution and extruded at 240° C. Neither example exhibits this new operating range below a shear rate of 2000 sec$^{-1}$. Examples 2-7 can be processed in a new operating range below 2000 sec$^{-1}$, and preferably below 1000 sec$^{-1}$, giving smooth and glossy extrudates without sharkskin or wavy surfaces and at a very low melt viscosity. It is also interesting that in the new operating range the melt viscosity is almost independent of the initial MI and the extrusion temperature. For example, note that in column 9, under new operating range, the viscosity at 1000 sec$^{-1}$ shear rate for examples 2-7 fall within close range of one another, whereas under the traditional operating range the minimum viscosity fluctuates from approximately 600 to 17,000.

materials prepared and the procedures followed relate to specific preferred embodiments of the broad invention. It is apparent from the foregoing general description and the specific embodiments that while forms of the invention have been illustrated and described, various modifications can be made without departing from the spirit and scope of this invention. Accordingly, it is not intended that the invention be limited thereby

We claim:

1. A process for processing a polyolefin comprising heating a polyolefin having a molecular weight distribution, Mw/Mn of less than 3.3 and a melt index less than 5 g/10 min, extruding said polyolefin at a shear stress of less than 0.5 MPa, at an extrusion temperature less than 200° C. and at a shear rate greater than the shear rate immediately above the shear rate at the end of the slipstick region of said polyolefin but less than about 2000 sec$^{-1}$.

2. The process of claim 1 wherein the polyolefin has a melt index of less than about 4 g/10 min, an Mw/Mn less than about 3 and the extrusion temperature is less than about 190° C.

3. The process of claim 1 wherein the polyolefin has a melt index of from about 0.01 to about 2 g/10 min, and an Mw/Mn of less than about 3.

4. The process of claim 1 wherein the polyolefin is an ethylene polymer with a density between 0.88 and less than about 0.95 g/cm$^3$.

5. The process of claim 1, wherein the polyolefin is an ethylene polymer with a melt index less than about 4 g/10 min. and a molecular weight distribution less than about 3.

6. The process of claim 1 wherein the polyolefin is a copolymer of ethylene and butene or hexene.

7. The process of claim 1 wherein the shear rate is greater than the shear rate immediately above the shear rate at the end of the slipstick region of said polyolefin but less than 1000 sec$^{-1}$ and the shear stress is less than about 0.45 MPa.

8. The process of claim 7 wherein the polyolefin has a melt index of from about 0.01 to about 4 g/10 min, an Mw/Mn of less than about 3 and is extruded at a temperature below about 190° C.

9. The process of claim 7 wherein the polyolefin has a melt index of about 0.01 to about 2 g/10 min and a Mw/Mn of less than about 3.

10. The process of claim 1 wherein the extrusion temperature is from about 60° to about 190° C.

11. A process for extrusion coating a polyolefin about a wire or cable comprising:
   heating a polyolefin having a molecular weight distribution less than about 3.3 and an MI less than about 5 g/10 min;
   and extruding said polyolefin at an extrusion temperature of less than about 200° C., at a shear rate greater than the shear rate immediately above the shear rate at the end of the slipstick region of the polyolefin but lower than 2000 sec$^{-1}$ and at a shear stress of about 0.5 MPa or less, onto a wire or cable.

12. A process for producing film comprising heating a polyolefin with a molecular weight distribution less than about 3.3, a melt index less than about 5 g/10 min, and extruding said polyolefin at an extrusion temperature less than about 200° C., at a shear rate greater than the shear rate immediately above the shear rate at the end of the slapstick region of the polyolefin but lower than 2000 sec$^{-1}$ and at a shear stress of about 0.5 MPa or less, and blowing or casting said polyolefin into a film.

13. A process for coating a substrate comprising heating a polyolefin with a molecular weight distribution less than about 3.3, a melt index less than about 5 g/10 min, extruding said polyolefin at an extrusion temperature less than about 200° C. and at a shear rate greater than the shear rate immediately above the shear rate at the end of the slipstick region of the polyolefin but less than about 2000 sec$^{-1}$, and coating the polymer onto a substrate.

14. A method for producing a polyolefin extrudate substantially free from sharkskin melt fracture comprising the steps of:
   selecting a polyolefin having a MWD less than about 3.3 and a melt index less than about 5 g/10 min; and extruding the polyolefin at a shear stress of less than about 0.5 MPa, an extrusion temperature of less than about 200° C. and at a shear rate greater than the shear rate immediately above the shear rate at the end of the slipstick region of the polyolefin but less than 1000 sec$^{-1}$.

* * * * *